United States Patent [19]

Brady et al.

[11] Patent Number: 5,389,170
[45] Date of Patent: Feb. 14, 1995

[54] METHOD FOR BONDING SUBSTRATES USING MOLTEN MOISTURE REACTIVE ORGANOSILOXANE COMPOSITIONS

[75] Inventors: William P. Brady, Sanford; Martin E. Cifuentes, Midland; William J. Schoenherr, Midland; David L. Stickles, Midland; Michael R. Strong, Midland; Bernard Vanwert, Midland; Gary A. Vincent, Midland; Randall G. Schmidt, Midland, all of Mich.

[73] Assignee: Dow Corning Corporation, Midland, Mich.

[21] Appl. No.: 75,989

[22] Filed: Jun. 11, 1993

[51] Int. Cl.⁶ .............................................. C03C 27/00
[52] U.S. Cl. .................................. 156/109; 156/152; 156/329; 525/477
[58] Field of Search ................. 156/152, 109, 329; 525/477

[56] References Cited

U.S. PATENT DOCUMENTS

| | | |
|---|---|---|
| 2,814,601 | 11/1957 | Currie et al. . |
| 4,143,088 | 3/1979 | Favre et al. . |
| 4,485,206 | 11/1984 | Inoue et al. ........................ 525/477 |
| 4,515,932 | 5/1985 | Chung . |
| 4,753,977 | 6/1988 | Merrill . |
| 4,865,920 | 9/1989 | Sweet . |
| 4,990,364 | 6/1988 | Bolte et al. . |
| 5,070,121 | 11/1989 | Hinterwald . |
| 5,091,484 | 2/1992 | Colas et al. . |
| 5,162,410 | 11/1992 | Sweet . |
| 5,210,156 | 5/1993 | Clark et al. . |

FOREIGN PATENT DOCUMENTS

| | | |
|---|---|---|
| 251837 | 5/1991 | Japan . |
| 81487 | 3/1992 | Japan . |
| 998232 | 7/1965 | United Kingdom ............... 525/477 |
| 1181519 | 2/1970 | United Kingdom ............... 156/109 |
| 420864 | 11/1989 | United Kingdom . |
| 9108240 | 6/1991 | WIPO . |

OTHER PUBLICATIONS

Hardman et al., "Silicones", vol. 15, 2nd Edition, pp. 218–219, ©1989.

Primary Examiner—John J. Gallagher
Attorney, Agent, or Firm—Robert Spector

[57] ABSTRACT

Curable adhesive compositions comprise combinations of organosiloxane MQ resins and liquid polyorganosiloxanes of specified viscosity and functionality. The compositions are substantially free of unreactive materials and are applied in the molten state. Depending upon the concentration of reactive groups on the resin and polyorganosiloxane, the compositions may also include a silane containing an average of more than two hydrolyzable groups per molecule. Preferred compositions develop excellent adhesion to a variety of organic and metallic substrates during curing under ambient conditions.

14 Claims, No Drawings

METHOD FOR BONDING SUBSTRATES USING MOLTEN MOISTURE REACTIVE ORGANOSILOXANE COMPOSITIONS

FIELD OF THE INVENTION

This invention relates to a method for bonding substrates to one another. More particularly, this invention relates to heating one of a specified class of solventless moisture reactive organosiloxane compositions to a flowable state, applying the composition to a first substrate as an adhesive layer, placing a second substrate in contact with the adhesive layer while the composition is reflowable with heating, and allowing the composition to cure. The strength of the bond between the substrates increases as the composition gradually converts from a thermoplastic material to a cured resin-reinforced elastomeric material that is not reflowable when heated to temperatures well above the application temperature.

BACKGROUND INFORMATION

Many combinations of resinous and liquid organic and organosilicon polymers are known. Some of these combinations exhibit the properties characteristic of pressure sensitive adhesives, also referred to as PSA's.

PSA's based on organosilicon compounds typically contain 1) a silicone resin containing specified concentrations of monofunctional $R_3SiO$ units, referred to as M units, and tetrafunctional $SiO_{4/2}$ units, referred to as Q units, and 2) a high molecular weight polydiorganosiloxane having the consistency of a gum. These compositions are typically applied as a solution in a compatible organic liquid or a low viscosity, liquid non-reactive polyorganosiloxane. Following application of the solution to a desired substrate the liquid is evaporated to deposit the PSA.

U.S. Pat. No. 2,814,601, issued to Currie et al. describes curable silicone PSA's useful for bonding silicone rubber to metals such as aluminum, and which cure to a permanent adhesive at room temperature even in the absence of moisture.

U.S. Pat. No. 4,865,920, which issued to R. Sweet, describes solventless silicone PSA's that can be applied as a heated melt, also referred to as a hot melt. The compositions differ from prior art PSA's by replacement of the gum type polydiorganosiloxane with a liquid polydiorganosiloxane and by addition of from 1 to 10 percent, based on the combined weight of the organosilicon compounds, of a liquid ester of a monocarboxylic acid containing from 2 to 32 carbon atoms. Replacing this ester with a phenyl-containing polyorganosiloxane fluid to make the PSA more compatible with drugs and other organic materials is described in U.S. Pat. No. 5,162,410, which issued to R. Sweet.

The hot melt PSA's described in both Sweet patents do not contain moisture activated reactive groups capable of forming a cured material, and therefore retain the flowability at elevated temperatures and the tackiness characteristic of PSA's.

A copending application, Ser. No. 07/748,478, filed on Aug. 22, 1991 describes silicone PSA's that cure in the presence of moisture to permanent adhesives. The compositions are particularly useful as structural adhesives for adhering glass panels to structural materials such as concrete, aluminum and steel. The two required ingredients of the PSA are an MQ resin and a high consistency polydiorganosiloxane gum wherein at least 50 percent and preferably at least 90 percent of the silicon-bonded hydrocarbon radicals are methyl.

One or both ingredients of the PSA compositions described in the aforementioned copending application contain moisture activated curing groups of the formula $R_b(OR')_{3-b}SiZ—$, where R represents a monovalent hydrocarbon radical, R' represents an alkyl or aryl radical, Z is a divalent group that durably links the curing group to a silicon atom of one of the PSA ingredients and the value of b is 0 or 1. Typical linking groups that can be represented by Z include but are not limited to oxygen, one or more diorganosiloxane units, and hydrocarbylene radicals that optionally contains one or more hetero atoms selected from oxygen, nitrogen and sulfur.

Due to the high viscosity of gum type polydiorganosiloxanes even at elevated temperatures, the moisture curable PSA compositions are not suitable for application as heated molten materials, but instead are applied to substrates as solutions in a miscible organic solvent such as xylene. The solvent is removed prior to curing of the composition or evaporates during the curing reaction.

Japanese laid open patent application (Kokai) No. 4(1992)81, 487 describes curable pressure sensitive adhesive compositions comprising (1) 100 parts by weight of an organosiloxane copolymer consisting essentially of triorganosiloxy and $SiO_{4/2}$ units and up to 0.7 weight percent of silanol groups, where the molar ratio of triorganosiloxy to $SiO_{4/2}$ units is from 0.6 to 1.2, respectively, (2) a liquid polydiorganosiloxane containing as the terminal units alkoxy, alkenyloxy, iminoxy, acyloxy and/or aminoxy radicals, and (3) a condensation catalyst to promote curing of the composition in the presence of moisture. The molar ratio of silanol groups in the resinous copolymer to terminal units in the liquid polydiorganosiloxane is from 1 to 10.

The characterizing feature of the moisture reacting compositions described in the Japanese patent application is their ability to retain the characteristics of pressure sensitive adhesives under both dry and wet conditions following reaction of the moisture reactive groups. This requires that the molar ratio of silanol units in the resinous copolymer to terminal units in the liquid polydiorganosiloxane be from 1 to 10, and preferably from 4 to 8. Typical final bonding strengths of compositions exemplified in this published patent application are about 90 pounds.

U.S. Pat. No. 5,091,484, which issued to A. Colas on Feb. 25, 1992 describes elastomer-forming compositions containing (1) a hydroxyl- or alkoxy-terminated polydiorganosiloxane (2) an alkoxy-functional MQ type silicone resin that is preferably liquid under ambient conditions and (3) a titanium-containing curing catalyst. These compositions are described as flowable under ambient conditions and cure in the presence of atmospheric moisture to yield elastomeric materials.

Moisture curable elastomer-forming compositions containing (1) a hydroxyl-terminated polydiorganosiloxane (2) an MQ type silicone resin containing from 0.5 to 6 weight percent of hydroxyl groups, (3) alkoxy-functional organosilicon compounds as the curing agent, and (4) a titanium-containing curing catalyst are described in U.S. Pat. No. 4,143,088, which issued to G. Favre et al. on Mar. 6, 1979.

Organic polymer compositions that are solid under ambient conditions and sufficiently flowable when heated to be applied as coatings that can subsequently be cured by a free radical reaction are described in U.S. Pat. No. 4,990,364, which issued to Bolte et al., U.S. Pat. No. 5,070,121, which issued to Hinterwaldner et al., and Japanese Laid Open Application 89/251,837.

Moisture curable organic polymer compositions that form conventional or pressure sensitive adhesives and can be applied as heated melts are described in Published European Patent Application No. 0420864. The compositions comprise a silane-modified copolymer of ethylene and a polar monomer such as vinyl acetate, a catalyst and an optional plasticizer. The modified polymers contain silicon-bonded hydrolyzable groups.

Patent application WO 91/08420, filed under the provisions of the Patent Cooperation Treaty, describes adhesive compositions containing a tackifier resin or tackifier wax that has been modified by reaction with a silane containing hydrolyzable groups that are present in the final resin or wax. The composition optionally contains an organic polymer with groups capable of reacting with the silicon-bonded hydrolyzable groups to form a crosslinked material.

When curable compositions applied in the molten state are used as adhesives to join two or more substrates to form a composite structure, the cooled uncured compositions should exhibit sufficient adhesion, referred to as "green strength", to allow the structure to be transported or otherwise manipulated as required without adversely affecting the integrity of the bonded structure.

With the increasing emphasis on eliminating or at least reducing the amount of volatile materials released during the application and curing of coating compositions, there has been a growing demand for curable adhesive compositions that can be applied in the absence of solvents or diluents.

It is therefore an objective of the present invention to provide moisture reactive adhesive compositions that are substantially free of unreactive liquid materials and can be heated for application as molten liquids that upon contacting a substrate at ambient temperature rapidly develop strong adhesion between clean or contaminated substrates without requiring priming or other surface preparation.

The initially applied adhesive layer exhibits the properties of a pressure sensitive adhesive with high initial bonding strength, but is reflowable upon heating. In the presence of moisture under ambient conditions the adhesive gradually converts to a substantially tack-free resin-reinforced elastomeric material that is no longer reflowable even at temperature substantially above their application temperature. After conversion to a cured material the adhesive exhibits a higher bonding strength relative to the initially applied material and typical pressure sensitive adhesives.

In contrast to many organic adhesives applied as melts, which cannot effectively be remelted to form adhesive bonds once the adhesive has cooled, the ability of the present compositions to form adhesive bonds exists throughout the period of reflowability, which typically extends substantially beyond the time required for the compositions to cool to ambient temperature.

SUMMARY OF THE INVENTION

The present inventors discovered that the objectives of this invention can be achieved using moisture curable organosiloxane compositions containing combinations of organosiloxane MQ resins and liquid polyorganosiloxanes of specified viscosity and functionality. Depending upon the concentration of reactive groups on the resin and polyorganosiloxane, and the storage stability of the composition. The composition may also include a silane containing an average of more than two hydrolyzable groups per molecule. Preferred compositions develop excellent adhesion to a variety of organic and metallic substrates during curing.

DETAILED DESCRIPTION OF THE INVENTION

This invention provides a method for bonding substrates to one another using a curable organosiloxane composition, the method comprising the sequential steps of I) causing a curable organosiloxane composition to become flowable by heating the composition above its flow-transition temperature, where the curable composition comprises (a) a resinous organosiloxane copolymer comprising monovalent $R^1_3SiO_{\frac{1}{2}}$ units, tetravalent $SiO_{4/2}$ units and up to 6 weight percent, based on the weight of said copolymer, of $XSiO_{3/2}$ units, where X is at least one member selected from the group consisting of hydroxyl groups, hydrolyzable groups and trihydrocarbylsiloxy groups, $R^1$ is a monovalent hydrocarbon radical, and the molar ratio of $R^1_3SiO_{\frac{1}{2}}$ to $SiO_{4/2}$ units is from 0.5 to 1.2, and (b) a polyorganosiloxane having a viscosity of from 0.02 to 100 Pa.s at 25° C. and containing an average of more than two hydrolyzable groups per silicon atom, at least 80 percent of the repeating units of said polyorganosiloxane are disiloxane units, and where the amount of said resinous organosiloxane copolymer relative to said polyorganosiloxane is sufficient for a 0.07 mm-thick vertical layer of said composition to be substantially non-flowable at 25° C. prior to reaction of said hydrolyzable groups, and for said composition to have a flow transition temperature within the range from 40° to 200° C.;

II) applying said composition while in the flowable state to at least one surface of a first substrate to form a bonding layer;

III) contacting said bonding layer with a second substrate prior to any substantial increase in the flow transition temperature of said composition to achieve bonding between said first and second substrates, and IV) exposing the bonded substrates to atmospheric moisture for a time sufficient to react said hydrolyzable groups, to form a crosslinked structure and increase the flow transition temperature of said composition by at least 10° C.

At least a portion of the hydrolyzable groups present on the polyorganosiloxane ingredient, referred to as ingredient (b), can be derived from silanol groups on an initial reactant. In this instance the curable composition contains at least an equimolar quantity, based on the number of silanol groups, of a silane or other low molecular weight organosilicon compound having at least three hydrolyzable groups per molecule. It will be understood that a reaction will occur between the silane and the silanol groups present in the precursor to ingredient (b), particularly if a catalyst promoting this reaction is present in the composition.

Ingredients of the Curable Organosiloxane Compositions

The ingredients present in the curable organosiloxane compositions used as adhesives in accordance with the present method include but are not limited to at least one resinous organosiloxane copolymer comprising triorganosiloxy and $SiO_{4/2}$ units, referred to as MQ resins, and at least one polyorganosiloxane with a viscosity of from 0.02 to 100 Pa.s at 25° C.

The present method is based on the identification of certain MQ resins and liquid polyorganosiloxanes and a range of relative concentrations within which these ingredients are substantially non-flowable at 25° C. without gelation in the absence of moisture, and form a flowable melt at temperatures from 40° to about 200° C. The molten composition adheres well to a variety of both inorganic and organic substrates, retains this adhesion upon cooling, and can be applied using many of the coating techniques conventionally used for liquid and molten materials.

As the temperature of the present compositions decreases from the temperature at which the composition flows to the temperature of the substrate, typically about 25° C., there appears to be a temperature or a narrow temperature range where the composition undergoes a transition from a material that flows as a useful coating material to one that does not flow or "sag" within about a one minute period when applied as a 0.07 ram-thick layer on a vertical substrate. The non-flow state is equivalent to a viscosity of at least 200,000 centipoise (200 Pa.s) at 25° C. or a minimum room temperature dynamic viscosity in the approximate range of from $2 \times 10^7$ to $8 \times 10^7$ centipoise (20 to 80 kPa. s) when measured at 1 radian/sec. Coatings prepared from lower viscosity compositions will typically gradually drip off a vertical substrate under these conditions.

Another way of determining whether a composition meets the present requirement of being "non-flowable" at 25° C. is to place about 200 cc of a molten composition in a 600 cc-capacity jar and allow the melt to solidify. When the jar containing the solidified composition is placed on its side, there is no evidence of flowing during a twenty minute period.

In the presence of moisture the hydrolyzable groups present on at least the polyorganosiloxane ingredient of the present compositions react to gradually crosslink the adhesive to a material that will no longer flow at the temperature used to apply the adhesive. During at least the initial stages of this conversion the flow transition temperature of the composition does not appreciably increase, and the composition exhibits the properties of a typical pressure sensitive adhesive in that the composition can be reflowed and adhesive bonds formed or reformed by heating the composition to temperatures of from 60° to 200° C.

During conversion of the present compositions from materials that flow at elevated temperatures to non-flowable resin containing reinforced elastomers by reaction of the hydrolyzable groups, the flow transition temperature of the composition increases by at least 10° C. relative to the initial composition. Preferred compositions cannot be reflowed by heating them up to 200° C. following reaction of the hydrolyzable groups.

The flow transition temperature and other rheological properties of a composition of this invention can be varied by selection of a particular MQ resin, also referred to herein as "resin" and polyorganosiloxane, also referred to in the specification as "polymer", and by varying the relative concentrations of these two ingredients.

It should be understood that inclusion of two or more different resins and polymers will affect not only the flow characteristics of the blend but also the properties of the product obtained following reaction of the silanol and hydrolyzable groups to form a crosslinked adhesive that is preferable elastomeric rather than resinous.

The relative concentrations of resin and polymer required to achieve the optimum combination of properties that characterize the present compositions while avoiding premature gelling is dependent at least in part on the molecular weights of the resin, polymer, and the concentration of reactive groups in these ingredients.

In addition to the requirement for non-flowability at 25° C., the range for the weight ratio of resin to polymer is in terms of the melt viscosity of the mixture prior to reaction of the hydrolyzable groups, which is typically less than about 10 (?) Pa.s and can be as low as 0.1 Pa.s, preferably at least 0.5 Pa.s, at the temperature used to apply coatings in accordance with the present method. The composition remains reflowable with heating during at least the early stages of the conversion to a material that is preferably elastomeric.

For preferred combinations of MQ resins and liquid polyorganosiloxanes encompassed by the present invention the resin constitutes from 40 to 80 percent of the combined weight of the resin and the liquid polyorganosiloxane. The present inventors discovered that while all combinations of resin and polymer may not form useful adhesive compositions over this entire range, they will do so somewhere within this range. It will be apparent to those skilled in the art that the range of resin to polymer weight ratios for a particular combination of resin and polymer will be dependent upon the concentration of reactive groups in the composition, which is, in turn, a function of the molecular weight of the resin and polymer and the concentration and reactivity of any silane present in the composition.

Compositions containing less than about 40 weight percent of even the highest molecular weight resins are flowable at 25° C. as a 0.07 mm-thick layer on a vertical surface, even when the resin is the highest molecular weight that will form a flowable composition in accordance with the present method. Compositions containing more than about 80 weight percent of resin are difficult to process using conventional blending and dispensing techniques at temperatures up to 200° C. and form adhesives that are often brittle, even using the lowest molecular weight resins useful in accordance with the present method.

Curing agents and/or curing catalysts can be part of the present composition. The requirement for the presence of reactive silanes to form useful adhesives is dependent upon the types and concentrations of reactive groups present on the resinous copolymer(s) and the liquid polyorganosiloxane(s), the molecular weight of the resin, which can affect the storage stability of the composition, and the desired curing reaction.

The Resinous Copolymer (MQ Resin)

The resinous copolymer constitutes one of the two types of polymeric organosiloxane materials present in compositions that are used as adhesives in accordance with the present method. The resin contains monofunctional (M) units represented by the formulae $R^1{}_3SiO_{\frac{1}{2}}$ and tetrafunctional (Q) units represented by the formula $SiO_{4/2}$. $R^1$ represents a substituted or unsubstituted monovalent hydrocarbon radical Resins of this type are well known in the art as one of the ingredients present in organosiloxane compositions used as pressure sensitive adhesives.

The MQ resins are soluble in liquid hydrocarbons such as benzene, toluene, xylene, heptane and the like or in liquid organosilicon compounds such as a low viscosity cyclic and linear polydiorganosiloxanes.

In the $R^1_3SiO_{\frac{1}{2}}$ or M unit $R^1$ preferably represents a monovalent hydrocarbon radical containing up to 20 carbon atoms, and most preferably from 1 to 10 carbon atoms.

Examples of suitable hydrocarbon radicals for $R^1$ include alkyl radicals, such as methyl, ethyl, propyl, pentyl, octyl, undecyl and octadecyl; alkenyl radicals, such as vinyl, allyl and 5-hexenyl; cycloaliphatic radicals, such as cyclohexyl and cyclohexenylethyl; and aryl radicals such as phenyl, tolyl, xylyl, benzyl and 2-phenylethyl. Non-reactive substituents that can be present on $R^1$ include but are not limited to halogen and cyano. Typical substituted hydrocarbon radicals that can be represented by $R^1$ include but are not limited to chloromethyl and 3,3,3-trifluoropropyl.

At least one-third, preferably at least two-thirds of the $R^1$ radicals in the formula for the M unit of the MQ resin are methyl radicals. Examples of preferred M units include but are not limited to $HMe_2SiO_{\frac{1}{2}}$, $Me_3SiO_{\frac{1}{2}}$, $phMe_2SiO_{\frac{1}{2}}$ and $Me_2ViSiO_{\frac{1}{2}}$ where Me, Ph and Vi denote methyl, phenyl and vinyl, respectively. The resin may contain two or more of these units.

The molar ratio of the M to Q units in the MQ resin is typically from 0.5/1 to 1.5/1, preferably from 0.6/1 to 0.9/1. These mol ratios are conveniently measured by $Si^{29}$ n.m.r. spectroscopy. This technique is capable of quantitatively determining the concentration of M and Q units derived from the resin and from the neopentamer, $Si(Me_3SiO)_4$, present in the initial resin, in addition to the total hydroxyl content of the resin. For the purposes of the present invention the M/Q ratio can be expressed as {M(resin)+M(neopentamer)}/{Q(resin)+Q(neopentamer)} and represents the ratio of the total number of triorganosiloxy groups of the resinous and neopentamer portions of the resin to the total number of silicate groups in the resinous and neopentamer portions.

The concentration of silanol groups present in the resin can be determined using Fourier transform infrared spectrophotometry (FTIR)

The resin must be a solid at room temperature, i.e. the glass transition temperature of this material is above ambient temperature, preferably above 40° C.

The copolymer also contains up to 6 weight percent of terminal units represented by the formula $XSiO_{3/2}$, where X represents hydroxyl or a hydrolyzable group. A portion of the groups represented by X can be trihydrocarbylsiloxy such as trimethylsiloxy. The hydroxyl and hydrolyzable groups react with the hydrolyzable groups on the polymer ingredient during curing of the present compositions. The resultant resin-to-polymer bonding is believed responsible for the retention of adhesive strength at temperatures above about 50° C.

Suitable hydrolyzable groups include but are not limited to alkoxy such as methoxy and ethoxy, alkenyloxy such as isopropenyloxy, ketoximo such as methyethylketoximo, carboxy such as acetoxy, amidoxy such as acetamidoxy and aminoxy such as N,N-dimethylaminoxy.

To exhibit useful adhesion at elevated temperatures the MQ resin contains at least 1.5 weight percent, based on the weight of the resin, of reactive groups such as silanol groups and/or hydrolyzable groups such as alkoxy groups. It will be understood that silanol groups can be present only in the absence of a suitable catalyst for the reaction of these silanol groups with the alkoxy or other hydrolyzable groups present on the polyorganosiloxane and/or silane ingredients of the present compositions.

It will be understood that if all the initial silanol groups of the MQ resin are converted to triorganosiloxy groups by reaction with a monofunctional silane, disiloxane or disilazane the copolymer does not participate in the reaction(s) used to cure the composition, and the adhesive typically fails at temperatures above about 60° C.

The number average molecular weight, $M_n$, required to achieve the desired flow characteristics of the MQ resin will depend at least in part on the molecular weight of the resin and the type(s) of hydrocarbon radicals, represented by $R^1$, that are present in this ingredient. For the preferred resins where $R^1$ is alkyl containing from 1 to 3 carbon atoms the number average molecular weight of the resin is preferably from 1500 to about 10,000, preferably from 2700 to 6500 when measured using gel permeation chromatography, when the peak representing the neopentamer is excluded form the measurement. In this determination narrow fractions of MQ resins are used to calibrate the equipment.

The number average molecular weight ($M_n$) of the resin is preferably greater than 3,000, most preferably from 4500 to 7500, because the thermal hold, i.e the ability of an adhesive to retain its adhesion at elevated temperatures, typically above 150° C., becomes appreciable when the $M_n$ exceeds 3000.

The MQ resin can be prepared by any suitable method. Resins of this type have reportedly been prepared by cohydrolysis of the corresponding silanes or by silica hydrosol capping methods known in the art. The MQ resin is preferably prepared by the silica hydrosol capping processes of Daudt, et al., U.S. Pat. No. 2,676,182; of Rivers-Farrell et al., U.S. Pat. No. 4,611,042; and of Butler, U.S. Pat. No. 4,774,310; each of these patents being incorporated herein by reference as a teaching of preparing MQ resins which can be reacted to contain terminal groups that participate in curing of the present compositions.

The intermediates used to prepare the MQ resin are typically triorganosilanes of the formula $R^1_3SiX'$, where $X'$ represents a hydrolyzable group, and either a silane with four hydrolyzable groups such as halogen, alkoxy or hydroxyl, or an alkali metal silicate such as sodium silicate.

To maximize the storage stability of the present compositions under ambient conditions the silanol groups formed during preparation of the MQ resin are converted to trihydrocarbylsiloxy groups or a hydrolyzable group such as those described in the preceding section of this specification. The conversion is conveniently achieved by reacting the resin with a silane, disiloxane or disilazane containing the appropriate terminal group. Silanes containing hydrolyzable groups are typically added in excess of the quantity required to react with the silanol groups of the resin. The reaction of these hydrolyzable groups in the presence of moisture is responsible for conversion of the present compositions from materials that are flowable with heating to resin reinforced elastomers that may soften but do not flow at temperatures from 60° to 200° C.

The Polyorganosiloxane

The polyorganosiloxane ingredient of adhesive compositions suitable for use in accordance with the present method is composed, at least in major part, of difunctional (D) repeating units of the formula $R^2R^3SiO$. The polymers can optionally contain up to about 20 percent, based on total repeating units, of trifunctional (T) units of the formula $R^4SiO_{3/2}$. In these formulae $R^2$ represents an alkoxy group or a monovalent unsubstituted or substituted hydrocarbon radical, and $R^3$ and $R^4$ are monovalent unsubstituted or substituted hydrocarbon radicals.

At least 50 percent, preferably at least 80 percent, of the radicals represented by $R^2$, $R^3$ and $R^4$ are lower alkyl most preferably methyl.

For the present compositions to achieve acceptable bonding prior to and following reaction of the moisture reactive groups present on at least the polyorganosiloxane, the molecules of polyorganosiloxane contain an average of more than about 15 repeating units per molecule, which is equivalent to a viscosity of at least 0.02 Pa. s at 25° C. for a polydimethylsiloxane, and can exhibit viscosities of up to 100 Pa.s. Viscosities of from 0.35 to about 60 Pa.s are preferred.

The terminal units present on the liquid polyorganosiloxane can be represented by the formula $R^5{}_aY_{3-a}SiG-$, where Y is a hydrolyzable group, $R^5$ is aminoalkyl or is selected from the same group of substituted and unsubstituted hydrocarbon radicals as $R^1$, G represents a divalent group linking the silicon atom of the terminal unit with another silicon atom and a is 0 or 1. If no curing agent such as a silane containing at least three hydrolyzable groups per molecule is present in the curable composition, the liquid polyorganosiloxane and/or the MQ resin should contain an average of more than two hydrolyzable groups per molecule in order to form a crosslinked product.

Typical hydrolyzable groups represented by Y include but are not limited to those discussed in the preceding section of this specification relating to the resinous organosiloxane copolymer.

When a is 0 the groups represented by Y can be alkoxy, ketoximo, alkenyloxy, carboxy, aminoxy or amidoxy. When a is 1 Y is preferably alkoxy and $R^5$ is alkyl such as methyl or ethyl, or aminoalkyl such as aminopropyl or 3-(2-aminoethylamino)propyl. The amino portion of the aminoalkyl radical can be primary, secondary or tertiary.

In the formula for the terminal unit G represents any divalent group or atom which is not hydrolyzable and links the silicon atom(s) of the terminal unit to another silicon atom of the liquid polyorganosiloxane ingredient such that the terminal unit is not removed during curing of the composition and the curing reaction is not adversely affected. Hydrolytically stable linkages represented by G include but are not limited to oxygen, hydrocarbylene such as alkylene and phenylene, hydrocarbylene containing one or more hetero atoms selected from oxygen, nitrogen and sulfur, and combinations of these linking groups.

G can represent a silalkylene linkage such as $-(OSiMe_2)CH_2CH_2-$, $-(CH_2CH_2CiMe_2)(OSiMe_2)CH_2CH_2-$, $-(CH_2CH_2SiMe_2)O-$, $(CH_2CH_2SiMe_2)OSiMe_2)O-$, $-(CH_2CH_2SiMe_2)CH_2CH_2-$ and $-CH_2CH_2-$, a siloxane linkage such as $-(OSiMe_2)O-$ or, more preferably, an oxygen atom.

Specific examples of preferred terminal groups include but are not limited to $(MeO)_3SiCH_2CH_2-$, $(MeO)_3SiO-$, $Me(MeO)_2SiO-$, $H_2NCH_2CH_2N(H)(CH_2)_3 SiO-$, $(EtO)_3 SiO-$, $(MeO)_3SiCH_2CH_2SiMeCH_2Si-MeCH_2CH_2SiMe_2O-$, $Me_2NOSiO-$, $MeC(O)N(H)SiO-$ and $CH_2=C(CH3)OSiO-$. Me in these formulae represents methyl and Et represents ethyl.

A portion of the terminal units represented by $R^5{}_aY_{3-a}SiG$ can be present on the MQ resin, depending upon whether the reactant used to form the terminal units is reacted with the MQ resin, the liquid polyorganosiloxane or a mixture of these ingredients.

The terminal units of the polyorganosiloxane and MQ resin present in the curable composition can be present on these initial reactants or the terminal units can be formed in situ by reaction of the corresponding silanol, alkenyl or SiH-groups present on a precursor polyorganosiloxane and/or MQ resin with an organosilicon compound containing the desired terminal group in addition to a group that will react with the group present on the precursor polyorganosiloxane and/or resin.

Organosilicon compounds that can be reacted with the silanol groups to form the reactive terminal groups present in the final curable compositions of the present invention include silanes, disiloxanes, disilazanes and functionally substituted polydiorganosiloxanes.

Silanes used to form hydrolyzable groups on the MQ resin or polyorganosiloxane can be represented by the general formula $Y_3SiG'$, where G' represents a group that will react with a silanol group to form the desired linking group G. It will be understood that G' can be selected from the same group as Y.

Disiloxanes can be represented by the formula $(Y_3Si)_2O$ and disilazanes by the formula $(Y_3Si)_2NH$.

When Y contains an alkoxy group, to increase the stability of the curable composition it may be desirable to separate this group from the closest siloxane unit by an alkylene radical such as ethylene. In this instance Y would be $(MeO)_3SiCH_2CH_2Si(Me_2)O$. Methods for converting alkoxy groups to trialkoxysilylalkyl groups are described in the prior art.

Moisture reactive groups having the formulae $(MeO)_3SiO-$ and $Me(MeO)_2SiO-$ can be introduced into a silanol-terminated polyorganosiloxane by compounds having the formulae $(MeO)_4Si$ and $Me(MeO)_3Si$, respectively. Alternatively, compounds having the formulae $(MeO)_3SiH$ and $Me(MeO)_2SiH$, respectively, can be used when the polyorganosiloxane contains silanol groups or alkenyl radicals such as vinyl and a platinum group metal or a compound thereof as a hydrosilation reaction catalyst. It will be understood that other hydrolyzable groups such as dialkylketoximo, alkenyloxy and carboxy can replace the alkoxy group.

The liquid polyorganosiloxane ingredient of the present compositions is preferably a polydimethylsiloxane containing three alkoxy or ketoximo groups, two ketoximo groups or two alkoxy groups together with either an alkyl or aminoalkyl radical.

The Optional Curing Agent

Depending upon the reaction used to cure the present compositions and the reactive terminal units present on the MQ resin and the liquid polyorganosiloxane, storage stability and/or curing of the composition may be enhanced by the presence of a curing agent that is typically a silane of the formula $R^6{}_nSiZ_{(4-n)}$, where $R^6$ represents a hydrocarbon radical selected from the same group as $R^1$ preferably an alkyl or a phenyl radical and Z is a hydrolyzable group that reacts with the terminal groups of at least the liquid polyorganosiloxane under ambient conditions to form a cured material and n is 0 or 1. Suitable hydrolyzable groups represented by Z include but are not limited to alkoxy containing from 1 to 4 carbon atoms, carboxy such as acetoxy, ketoximo such as methylethylketoximo and aminoxy.

Suitable curing agents include but are not limited to methyltrimethoxysilane, methyltris(methylethylketoximo)silane, methyltriethoxysilane, methyltriacetoxysilane and alkyl orthosilicates such as ethyl orthosilicate.

When the hydrolyzable group present on the polyorganosiloxane ingredient is alkoxy the present inventors discovered that the ability of the cured compositions to retain adhesion at elevated temperatures is improved when a phenyltrialkoxysilane such as phenyltrimethoxysilane is used as the curing agent.

The Optional Curing Catalyst

Some of the reactions used to cure the present compositions either require a catalyst or proceed at a considerably more rapid rate in the presence of a catalyst. Suitable curing catalyst will depend upon the curing reaction, and include but are not limited to tin salts of carboxylic acids, such as stannous octoate and dibutyltin dilaurate, and organotitanium compounds such as tetrabutyl titanate and partially chelated derivatives of these salts with chelating agents such as acetoacetic acid esters and beta-diketones.

The hydrolyzable groups can either all be present on the liquid polyorganosiloxane or a portion can be present on one or more silanes or other organosilicon compounds that react during curing of the composition.

To prevent premature curing of the composition it should be stored in the absence of moisture prior to being heated and applied as described in a following section of this specification.

Preparation of Curable Compositions

The manner in which the ingredients of the present curable compositions are combined can determine the processability and stability of the composition. Combining all of the ingredients, including resin, silanol-functional polyorganosiloxane, silane containing hydrolyzable groups and a catalyst may result in an undesirable degree of condensation between polymer and resin molecules, resulting in premature crosslinking and gelation of the reaction mixture.

A preferred method is to first react a silanol-terminated polyorganosiloxane with at least an equimolar amount, based on silanol groups, of a silane containing an average of at least three hydrolyzable groups per molecule. This reaction is typically conducted in the presence of a suitable catalyst such as an alkyl titanate. Heating of the mixture may be required for the reaction to proceed at a useful rate. The polyorganosiloxane is then blended with a liquified or solubilized MQ resin and the volatile materials are removed from the composition. The removal of volatile materials is achieved by heating the composition, preferably under less than atmospheric pressure.

Pre-reaction of the precursor polyorganosiloxane with the silane containing hydrolyzable groups is particularly desirable when the resin contains an average of more that about 3 silanol groups per molecule. It has been found that compositions containing resins of this type have a tendency to form gels in the presence of silanol-functional polymers, alkoxy functional silanes and catalysts such as organotitanium compounds.

Application of Adhesives

The melt viscosity of a curable composition containing at least one each of the MQ resins and liquid polyorganosiloxanes described in the preceding sections of this specification is a convenient way of determining suitable methods for applying the composition in accordance with the present method.

Conventional application methods suitable for use with molten materials include but are not limited to dipping, spraying, coextrusion, and spreading of viscous materials on the desired substrate using heated doctor blades, draw-down bars and calendar rolls.

Molten materials of suitable viscosity can be extruded as preformed films onto the desired substrate, where they eventually cure under ambient conditions. Alternatively, a preformed extruded film can be solidified on a non-adhering substrate in the absence of moisture, stored in a moisture impermeable container and subsequently applied to one of the two substrates intended to be bonded. The exposed surface of the film is then placed in contact with the second of the two substrates to be bonded and the composite is heated if required to bond the two substrates and exposed to the amount of moisture typically present in the atmosphere to convert the adhesive to a cured pressure sensitive adhesive or elastomer in accordance with the present method.

Compositions with melt viscosities less than about 1 Pa.s are suitable for spraying. Spraying of molten materials typically involves forcing the material under pressure from a heated storage container through a nozzle containing one or more orifices measuring from 0.1 to 2 mm. in diameter. To assist in dispersing the stream of liquid material emerging from the nozzle the stream can be contacted with a rapidly moving current of a gas such as air or nitrogen or directed against a suitable baffle.

Depending upon the distance between the storage container and the nozzle, it may be necessary to heat the conduit connecting the nozzle or other dispensing orifice and the storage container to avoid solidification of the composition in the conduit or to blend a heated gas with the composition prior to or during passage through the conduit.

The pressure required to transport the molten material from the storage container to the dispensing orifice can be generated by admitting a pressurized gas such as dry nitrogen into the container or by equipping the container with a mechanical device such as a ram, piston or follower plate. Equipment to transport and dispense moisture sensitive materials are commercially available and can be adapted for use with the present compositions by equipping them with appropriate heating means.

Adhesive compositions with melt viscosities too high for spraying can be applied to substrates by dispensing molten material onto a substrate and allowing it to spread under its own weight or with the use of heated draw down bars or doctor blades. To avoid premature curing, the reservoir of molten material from which the composition is dispensed should be maintained under a moisture-free gas such as dry nitrogen.

One advantage of the present compositions is that during the initial stage of the moisture activated conversion to a resin reinforced elastomer, the material behaves like a typical pressure sensitive adhesive, allowing the adhered substrates to be separated and rejoined.

Adhesive compositions prepared in accordance with the present method react slowly in the presence of atmospheric moisture to form elastomeric materials. The time required for completion of this process ranges from several days to several weeks, depending upon the types of moisture-activated reaction, the presence of any catalysts for this reaction and the temperature of the substrate. The reactions occurring during conversion of the present moisture reactive compositions and the means for adjusting the rate of these reactions are sufficiently well understood that a detailed discussion in the specification is not required.

The adhesion, solvent resistance and electrical properties of adhesive compositions in accordance with the present method make the compositions particularly useful in bonding electrical or electronic components, particularly if they are exposed to heat, moisture, or other adverse conditions during use. A particularly desirable property of the present adhesives is their surface resistivity values, which are typically about $10^{15}$ ohms/cm$^2$. The adhesives can be made thermally or electrically conductive by the use of appropriate fillers.

Materials that can be bonded together using the present adhesive compositions include but are not limited to organic materials, including natural and synthetic polymers that can be of the addition or condensation types. Synthetic organic polymers include but are not limited to polyesters, polyamides, polyolefins, polycarbonates, epoxide polymers, resins derived from formaldehyde and phenols or other co-reactants, melamine resins, and fluorine-containing polymers such as polytetrafluoroethylene. The polymers can include known reinforcing agents, including but not limited to glass and other mineral fibers, carbon fibers and ceramic materials.

Inorganic substrates that can be bonded using the present method include but are not limited to glass, metals, particularly conductive metals such as copper and aluminum, and ceramic materials.

The present compositions are particularly useful for bonding engineering plastics such as polycarbonates, polysulfones, polyimides and polybutylene terephthalate.

A preferred application for the present adhesive compositions is as replacements for the adhesives currently used on the spacers separating the two glass sheets of conventional insulating glass units used in curtain wall and other types of construction. Typically the spacer containing a desiccant is bonded to the glass sheets using an inner primary seal of polyisobutylene and an outer secondary seal that is a curable organic or silicone sealant. The secondary seal provides the strength required to hold the unit together, however this strength is developed over a substantial period of time, typically days, requiring that assembled units remain supported or clamped together until the adhesive has developed sufficient strength to make the insulating glass unit self supporting.

The present compositions offer an advantage over conventional moisture curable sealants because of their strong initial adhesion, thereby allowing a unit to transported and installed shortly after being assembled. Once cured the preferred compositions retain their strength at temperatures as high as 100° C.

EXAMPLES

The following examples describe typical curable compositions for use in accordance with the present method and preferred embodiments of this method. The examples should not be interpreted as limitations on the scope of the invention defined in the accompanying claims. Unless otherwise indicated all parts and percentages in the examples are by weight and viscosities are the values measured at 25° C.

General Procedure For Preparing Curable Compositions

I. The amounts of polydiorganosiloxane and solubilized resin required for a particular composition together with 0.5 weight percent, based on solids, of a curing catalyst, when used, were combined under ambient conditions in a glass reactor and heated at a temperature of from 50° to 60° C. for about 60 minutes, at which time the temperature applied to the reactants was increased and the contents of the flask were placed under reduced pressure until the temperature of the material in the reactor reached 150° C. under a pressure of no more than 10 mm Hg to remove solvents and other volatile materials. The pressure in the reactor was readjusted to atmospheric by admitting nitrogen, and the molten composition is transferred into a closed air-tight container for storage.

II. The MQ resin, polyorganosiloxane, and silane, when used, were blended to homogeneity, at which time 0.5 weight percent, based on solids, of stannous octoate was added as the reaction catalyst. The composition was then heated under a pressure of less than 10 mm Hg until the temperature of the composition reached 150° C., at which time the pressure in the reactor was restored to atmospheric using nitrogen. The resultant molten material was blended with 0.5 weight percent tetrabutyl titanate and transferred to an air-tight container for storage.

III. Identical to procedure II, except stannous octoate is omitted.

IV. The solubilized resin, polymer and methyltris(methylethyloximo)silane (35 weight percent, based on the combined weight of resin and polymer) were blended and then combined with diisopropoxy-bis(ethylacetoacetate)titanium as the curing catalyst. The composition was then heated under a pressure of less than 10 mm Hg until the temperature of the composition reached 150° C., at which time the pressure in the reactor was restored to atmospheric using nitrogen. The resultant molten material was then transferred to an air-tight container for storage.

The number average molecular weights of the resins were determined by gel-permeation chromatography (GPC) using Varian TSK 4000+2500 columns at 35° C., a chloroform mobile phase at 1 mL/min and an IR detector set at 9.1 microns to detect similar resins as standards. The $M_n$ values reported herein Si—O—Si. The GPC was calibrated using narrow fractions of similar resins at standards. The $M_n$ values reported herein exclude any neopentamer, (Me$_3$SiO)$_4$Si, present in the resin component.

The trimethylsiloxy/SiO$_{4/2}$ ratio of the resins was determined by $^{29}$Si nuclear magnetic resonance (NMR) spectra, and, in this case, the reported results include any neopentamer component present in the resin.

EXAMPLE 1

This example describes one species of adhesive compositions containing amine functionality useful in accordance with the present method and the effect of the varying the type of MQ resin, polyorganosiloxane, and the relative concentrations of these two ingredients on the properties of the final adhesive.

The substrates joined to form bonded composites were an open-ended rectangular tube formed from polybutylene terephthlate and a lid of the same material designed to cover one end of the tube. The walls of the tube measured 3.5 cm. and 6 cm. in length, 1.5 cm. in height, and 5 mm. in thickness. At one end of the tube the surface defined by the cross-sections of the four walls contained a recess to accommodate a lid measuring 2.1 by 1.2 cm. and 3 mm. in thickness. The upper surface of the lid was flush with the end of the tube.

The recess at the end of the tube was coated along its entire perimeter with a molten composition of this invention dispensed from a cartridge heated to a temperature of about 150° C and equipped with a conical nozzle with a 2 mm-diameter circular orifice. The lid was then pressed against the mating surface of the tube to ensure transfer of the adhesive composition along the entire perimeter of the lid.

All of the adhesive compositions solidified to non-flowable materials upon cooling to the temperature of the substrate. For periods ranging from 0.1 hour to 7 days the compositions could be converted to flowable materials by heating them. At the end of this period the compositions had cured to materials that could no longer be converted to flowable liquids by heating.

Some of the composites were tested 20 minutes after being formed by clamping the tube in a suitable jig and applying sufficient force against the interior surface of the lid using the ram of an arbor press to break the adhesive bond and push the lid out of contact with the walls of the tube. The press had been modified to measure the applied force. The test was repeated on other samples prepared in the same manner using the same adhesive, but at various intervals following joining of the lid to the tube.

The types and amounts of ingredients used to prepare the adhesive compositions appear in Table 1 as the weight ratio of MQ resin solids (resin) and liquid polydiorganosiloxane (polymer), and are based on a combined weight of resin and polymer of 100 parts. These percentages exclude any solvents added together with the resin ingredient.

The MQ resins are represented by numbers and the liquid polyorganosiloxanes (polymers) by letters, in accordance with the following definitions.

Resin 1—A 72 weight percent solution in xylene of an organosiloxane copolymer exhibiting a molecular weight of about 5000 and consisting essentially of trimethylsiloxy (M) and $SiO_2$ (Q) units in a molar ratio of about 0.6:1 and containing about 3.7 weight percent of silicon-bonded hydroxyl groups;

Resin 2—A 62 weight percent solution in xylene of resin 1 having an M:Q ratio of 0.71, wherein all but 0.8 weight percent of the about 90 percent of the silicon-bonded hydroxyl groups are converted to trimethylsiloxy groups.

Resin 3—An 81 percent solution in xylene of an organosiloxane copolymer exhibiting a number average molecular weight of 2700 and containing trimethylsiloxy and $SiO_{4/2}$ units in a molar ratio of about 1.1:1 and about 3.2 weight percent of silicon-bonded hydroxyl groups, based on the weight of the resin.

Resin 4—A 72 percent solution in xylene of an organosiloxane copolymer exhibiting a number average molecular weight of 5000 and containing trimethylsiloxy and $SiO_{4/2}$ units in a molar ratio of 0.75 and about 3.4 weight percent of silanol groups, based on the weight of the resin.

The number average molecular weights of the resins were determined by gel-permeation chromatography (GPC) using Varian TSK 4000+2500 columns at 35° C., a chloroform mobile phase at 1 mL/min and an IR detector set at 9.1 microns to detect Si—O—Si. The GPC was calibrated using narrow fractions of similar resins as standards. The $M_n$ values reported herein exclude any neopentamer, $(Me_3SiO)_4Si$, present in the resin component.

The trimethylsiloxy/$SiO_{4/2}$ ratio of the resins was determined by $^{29}Si$ NMR and, in this case, the reported results include any neopentamer component present in the resin.

Polymer A—A 50 weight percent solution in isopropanol of a polydimethylsiloxane prepared by reacting a silanol terminated polydimethylsiloxane exhibiting a viscosity of about 0.07 Pa.s with a stoichiometric excess, based on silanol groups, of 3(2-aminoethylamino)propyltrimethoxysilane;

Polymer B—A reaction product of 200 parts of a silanol terminated polydimethylsiloxane exhibiting a viscosity of about 0.07 Pa.s at 25° C. and containing about 1.2 weight percent silanol groups and 40.6 parts of 3(2-aminoethylamino)-propyltrimethoxysilane. The mixture was reacted at 60° C. for two hours.

Polymer C—A reaction product of a 75 parts by weight of a silanol-terminated polydimethylsiloxane having an average degree of polymerization of 18 with 10 parts of methyltrimethoxysilane and 15 parts of gamma-(2-aminoethylamino)propyltrimethoxysilane.

Polymer D—A reaction product of 200 parts of a silanol-terminated polydimethylsiloxane having an average degree of polymerization of about 400 and 3.5 parts of gamma-(2-aminoethylamino)propyltrimethoxysilane (95% purity). The reaction was conducted at 55–60 degrees for two hours and substantially all of the initial silanol groups were reacted.

TABLE I

| Sample No. | R Type | P | R/P | Catalyst[1] | Process |
|---|---|---|---|---|---|
| 1A | 3 | C | 75/25 | None | I |
| 1B | 3 | C | 65/35 | None | I |
| 2A | 3 | A | 65/35 | TBT, $Sn(Oct)_2$ | II |
| 3A | 2 | A | 53/47 | TBT | I |
| 3B | 2 | A | 58/42 | TBT | I |
| 3C | 2 | A | 63/37 | None | I |
| 4A | 2 | B | 62/38 | None | I |
| 4B | 2 | B | 65/35 | None | I |
| 5A | 2 | D | 60/40 | None | I |
| 5B | 2 | C | 55/45 | None | I |
| 6A | 1 | D | 60/40 | TDIDE[3] | IV |

TABLE I-continued

| Sample No. | R Type | P | R/P | Catalyst[1] | Process |
|---|---|---|---|---|---|
| 6B | 1 | D | 60/40 | TDIDE | IV[4] |

Notes:
R = Resin; P = Polymer
[1]TBT = tetrabutyl titanate or TDIDE used as catalyst @ 0.5 weight percent based on total composition weight.
[2]The force required to separate the lid from the remainder of the box.
[3]TDIDE = diisopropoxy-bis(ethylacetoacetate)titanium @ 0.5 weight percent, based on the combined weight of resin and polymer
[4]Comparison Example - Methyl tris(methylethylketoximo)silane replaced with an equal an equimolar amount of phenyltrimethoxysilane.
R/P = weight ratio of solid resin to polymer

TABLE 2

| Sample No. | Force Lbs./Kg. (Time in Hours) |
|---|---|
| 1A | 4/1.8 (4); 10/4.5 (24); 6/2.7 (7 days) |
| 1B | 38/17.1 (4); 66/29.7 (24); 96/43.2 (7 days) |
| 2A | 32/14.4 (0.3); 53/23.9 (4); 118/53.1 (24) |
| 3A | 10/4.5 (4); 16/7.2 (24); 72/32.4 (7 days) |
| 3B | 18/8.1 (4); 30/13.5 (24); 96/43.2 (7 days) |
| 3C | 32/14.4 (1); 74/33.3 (72) |
| 4A | 216/97.2 (8 days) |
| 4B | 186/83.7 (7 days) |
| 5A | 60/27 (0.3); 80/36 (1); |
| 5B | 9/4.1 (0.3); 176/79.2 (4); 191/86 (24) |
| 6A | 30/13.5 (1); 94/42.3 (14); |
| 6B | Gelled in Process (Comparative Example) |

EXAMPLE 2

This example illustrates the use of a blend of alkoxy-functional and aminoalkoxy-functional polyorganosiloxanes in an adhesive composition.

Approximately 58.2 gm of solubilized resin 1, 21.0 gm of polymer D described in Example 1, 7.0 gm of a 0.07 Pa.s-viscosity methyldimethoxysiloxy-terminated polydimethylsiloxane exhibiting a viscosity of 0.07 Pa.s, and 0.35 gm of tetrabutyltitanate, were combined and thoroughly blended in a glass reactor.

The mixture was then heated to a temperature of 150° C. under reduced pressure. The final pressure was no higher than 10 mm Hg. Approximately 0.35 gm of diisopropoxybis(ethylacetoacetate)titanium were then added and dispersed in the de-volatilized, molten mixture, following which the mixture was transferred to a metal cartridge where the material was permitted to cool to room temperature.

The resultant adhesive composition was evaluated for its adhesive strength as a function of cure time at room temperature as described in the preceding section of this specification. After one hour of curing approximately 13 lbs (5.9 kg.) of force was required to push the lid away from the ubular section of the composite. After 24 hours this force was 121 pounds (54.5 kg.).

EXAMPLE 3

This example demonstrates the effect of the molecular weight and relative concentration of the resin on the properties of the uncured and cured compositions weight ratios using methyltris(methylethyloximo)silane as the curing agent.

Curable compositions were prepared as described in Example 1 using the following methods:

V—A solution of resin 1 or 4 described in a preceding section of this specification was blended with a silanol-terminated polydimethylsiloxane exhibiting a number average molecular weight of about 45,000. The required amount of methyl-tris(methylethylketoximo)silane and 5 drops ( equivalent to about 0.1 g.) of dibutyltin dilaurate were added to the resultant mixture, which was then heated at a temperature of 150°-160° C. under a final pressure of 5 to 10 mm. Hg to remove volatile materials.

VI—Same as procedure V, with substitution of 0.5 g. of 2,5-di-isopropoxy-bis-ethylacetoacetate titanium for the dibutyltin dilaurate.

VII—Same as procedure V, but omit catalyst

VIII—A reactor was charged with all of the polymer and an amount of methyl-tris(methylethylketoximo)silane equivalent to one mole of the silane per mole of silanol groups on the polymer.

The curable compositions were isolated and evaluated as adhesives using procedures described in Example 1 of this specification.

The amounts of resin, polymer and silane together with the weight percentage of resin relative to resin and polymer, and the molar ratio of silane to silanol groups present in the curable composition are listed in Table 3. The force required to separate the lid from the box portion of the test sample and the cure time prior to testing of the sample are recorded in Table 4.

TABLE 3

| Sample | Method | Resin Type/Wt. (g.)[1] | Polymer Wt. (g.) | % R | Silane/SiOH |
|---|---|---|---|---|---|
| 1[2] | V | 1/60 | 60 | 40.8 | 0.43 |
| 2[2] | V | 1/66 | 66 | 45.7 | 0.43 |
| 3 | V | 1/72 | 50.9 | 50.9 | 0.43 |
| 4 | V | 1/78 | 42 | 56.2 | 0.43 |
| 5 | V | 1/84 | 36 | 61.7 | 0.43 |
| 6 | V[3] | 1/137.5 | 63.9 | 61 | 0.29 |
| 7 | VI | 1/137.5 | 42.86 | 70 | 0.57 |
| 8 | VII | 4/141 | 81.82 | 55 | 0.44 |
| 9 | VII | 4/141 | 66.7 | 60 | 0.45 |
| 10 | VII | 4/141 | 53.9 | 65 | 0.54 |
| 11 | VII | 4/387.9 | 215 | 56 | 0.41 |

[1]= weight of resin solution
[2]=Sample flowed at room temperature
[3]= Dibutyltin dilaurate omitted, comparative example, gelled during processing

TABLE 4

| Sample | Force Lbs./Kg. | Cure Time (Days) |
|---|---|---|
| 1 | 110/ | 14 |
| 2 | 198/ | 14 |
| 3 | 198/ | 14 |
| 4 | 220/ | 14 |
| 5 | 218/ | 14 |
| 6 | Gelled During Processing | |
| 7 | 160/ | 7 |
| 8 | 220/ | 30 |
| 9 | 220/ | 30 |
| 10 | 108/ | 30 |
| 11 | 220/ | 30 |

The following examples describe adhesive compositions of this invention containing alkoxy groups as the hydrolyzable group on the polymer and/or the curing agent.

The ingredients used to prepare the compositions are identified as follows:

Polymer A=a trimethoxysilyl-terminated polydimethylsiloxane having a degree of polymerization of about 400 and a viscosity of about 2,000 cP.

Polymer B=a hydroxyl-terminated polydimethylsiloxane having a degree of polymerization of about 400 and a viscosity of about 2,000 cP (2 Pa.s).

Polymer C = a hydroxyl-terminated polydimethylsiloxane having a degree of polymerization of about 40 and a viscosity of about 70 cP (0.07 Pa.s).

Polymer D = a triethoxysilyl-terminated polydimethylsiloxane having a degree of polymerization of about 400 and a viscosity of about 2,000 cP (2 Pa.s).

Polymer E = a methyldimethoxysilyl-terminated polydimethylsiloxane having a degree of polymerization of about 870 and a viscosity of about 11,000 cP (11Pa.s).

Polymer F = a polydimethylsiloxane containing terminal units of the formula —O$_{\frac{1}{2}}$(Me)$_2$SiCH$_2$CH$_2$(Me)$_2$SiO(Me)$_2$SiCH$_2$CH$_2$Si(OMe)$_3$, wherein Me represents a methyl radical, with a degree of polymerization of about 300 and a viscosity of about 2000 cP (2 Pa.s).

Polymer G = a methyldimethoxysilyl-terminated polydimethylsiloxane with a viscosity of about 52 cP (0.052 Pa.s).

Polymer H = a methyldimethoxysilyl-terminated polydimethylsiloxane having a degree of polymerization of about 400 and a viscosity of about 2,000 cP (2 Pa.s).

IBTMS = isobutyltrimethoxysilane.
MTM = methyltrimethoxysilane.
MTO = methyl-tris(methylethylketoximo)silane of the formula MeSi(N(OEt)Me)$_3$, in which Et represents an ethyl radical.

The resins used are represented by numbers as defined in Example 1.

TBT = tetra n-butyl titanate.
TDIDE = 2,5-di-isopropoxy-bis(ethylacetoacetate) titanium.
TEOS = tetraethoxysilane.

EXAMPLE 4

Fluid A (26.6 g), 16.2 g of phenyltrimethoxysilane, 0.35 g of TBT, and 60.2 g of Resin 1 were thoroughly mixed in a 3-necked reaction flask. The resulting mixture was devolatilized at reduced pressure (<10 mm Hg) as the temperature was increased to 130° C. This temperature was maintained for an additional 15 minutes. Once devolatilized, the system was restored to atmospheric pressure using dry nitrogen gas. Additional TBT was introduced (3.85 g of a 10% solution in MTM) and dispersed in the molten product. The resin/polymer ratio of this composition was 62/38 and the molar ratio of silane to resin silanol was 0.9. This composition was transferred to a clean metal cartridge, applied to test sample and evaluated at various times following application as described in Example 1.

| Test Time | Force |
| --- | --- |
| 20 min | 35 lb |
| 1 hr | 39 lb |
| 4 hr | 57 lb |
| 7 days | 146 lb |

EXAMPLE 5

Fluid A (76.0g), 47.6 g of IBTMS and 1.04 g of TBT were blended in a glass reactor, at which time 72 g. of resin 1 were added and thoroughly mixed. The resultant composition was heated at 60° C. for 45 minutes and then devolatilized as described in Example 4. Additional TBT [7.0 g. of a 14.3 % solution in MTM was dispersed in the molten product.

The resin/polymer ratio of this composition was 62/38 and the molar ratio of silane to silanol in the resin was 1.0. This composition was transferred to a clean metal cartridge and applied to test samples and evaluated as described in Example 1 with the following results:

| Test Time | Force |
| --- | --- |
| 1 min | 34 lb |
| 1 hr | 50 lb |
| 4 hr | 48 lb |
| 24 hr | 112 lb |
| 7 days | 198 lb |

EXAMPLE 5

This example illustrates a composition of the invention wherein two different hydroxyl-functional polymers were capped with alkoxy groups using an in-situ process.

A reaction flask was charged with 133.1 g of Resin 1, 45.8 g of TEOS, 29.9 g of MTM, 16 g of polymer B, 48 g of polymer C and 0.0016 g of potassium carbonate. This combination was mixed and reacted at 115° C. for 24 hours, at which time 0.48 g of 1,1,1-trichloro-2-methyl-2-propanol, 0.5-hydrate was added to neutralize the potassium carbonate and mixed in for an additional 30 minutes at 115° C. The resulting mixture was then filtered to remove particulates and potassium salts, and recovered in a glass container. A portion of this product (99.7 g) was devolatilized as in Example 1 and 0.34 g of TBT was dispersed in the molten product. The resin/polymer ratio of this composition was 60/40. The material was then transferred to a metal cartridge and tested as described in Example 1.

| Test Time | Force |
| --- | --- |
| 20 min | 33 lb |
| 4 hr | 48 lb |
| 1 day | 72 lb |
| 7 days | 89 lb |

EXAMPLE 6

Resin 1 (61.6 g) was thoroughly blended with 9.96 g of TEOS and 25.21 g of polymer D and this mixture was heated to 110° C. This combination was reacted for one hour using 0.18 g of stannous octoate catalyst, whereupon 0.18 g of mercaptopropyltrimethoxysilane was then mixed in to inactivate the catalyst. The pressure within the reactor was reduced to 2 mm Hg and the reaction mixture was devolatilized up to a temperature of 150° C., whereupon 0.35 g of TDIDE was dispersed in the mixture. The resin/polymer ratio of this composition was 64/36 and the molar ratio of silane to silanol in the resin was 0.5. The product was recovered and tested as described in Example 1 with the following results:

| Test Time | Force |
| --- | --- |
| 2 min | 56 lb |
| 25 min | 53 lb |
| 1 hr | 60 lb |
| 7 days | 220 lb |

The lid and tube portions of the test sample which had been tested after 2 minutes, 25 minutes and 1 hour were pressed back together immediately after these tests and re-tested after being exposed to ambient air for an additional 7 days. The adhesive strengths shown below for these samples illustrate the long "open times" provided by the present compositions. As used in this specification, open time denotes the time that the composition retains its PSA (pressure sensitive adhesive) character, (i.e., does not cure to an appreciable degree) under ambient conditions.

|  | TIME OF INITIAL TEST | FORCE AFTER 7 DAY RE-TEST |
| --- | --- | --- |
| Sample 1 | 2 min | 180 lb |
| Sample 2 | 25 min | 160 lb |
| Sample 3 | 1 hour | 140 lb |

EXAMPLE 7

Polymer D (21.2 g) was thoroughly mixed with 11.9 g of phenyltrimethoxysilane, at which time 0.26 g TBT and 44.1 g of Resin 1 were added. The resulting mixture was heated and maintained at 60° C. for approximately one hour, whereupon the mixture was devolatilized at reduced pressure (<10 mm Hg) as the temperature was raised to 150° C. As before, nitrogen was introduced to restore the reaction mixture to atmospheric pressure, and 0.26 g of TDIDE was dispersed in the molten product. The resin/polymer ratio of this composition was 60/40 and the molar ratio of silane to silanol in the resin was 0.88. The resultant pressure sensitive adhesive was then transferred to a metal cartridge and tested as described in Example 1 with the following results:

| Test Time | Force |
| --- | --- |
| 20 min | 28 lb |
| 1 hr | 32 lb |
| 5 hr | 48 lb |
| 24 hr | 92 lb |
| 7 days | 155 lb |

EXAMPLE 8

A reaction flask was charged with 133.1 g of Resin 1, 45.8 g of TEOS, 29.9 g of MTM, 16 g of polymer B, 48 g of polymer C and 0.008 g of potassium carbonate. This mixture was heated and maintained at 115° C. for 2.5 hours, which heating was followed by the addition of 0.2 g of 1,1,1-trichloro-2-methyl-2-propanol,0.5-hydrate and additional mixing for 30 minutes at 115° C. The product was allowed to cool to room temperature and transferred to a glass container. The product (112.5 g) was devolatilized as described in Example 5 and 0.38 g of TBT was dispersed therein. The resin/polymer ratio of this composition was 60/40.

The devolatilized PSA was recovered in a metal cartridge and tested as before:

| Test Time | Force |
| --- | --- |
| 20 min | 37 lb |
| 1 hr | 43 lb |
| 4 hr | 57 lb |
| 1 day | 56 lb |
| 7 days | 64 lb |

EXAMPLE 9

Resin 3 (60.4 g), 33.0 g of TEOS, 14.0 g of polymer E and 0.35 g of TBT were blended and the resultant mixture devolatilized at approximately 2 mm Hg and a temperature of 150° C. The resin/polymer ratio of this composition was 80/20 and the molar ratio of silane to resin silanol was 1.5. The devolatilized mixture was then recovered and tested as described in Example 1 with the following results:

| Test Time | Force |
| --- | --- |
| 20 min | 66 lb |
| 1 hr | 86 lb |
| 4 hr | 80 lb |
| 3 days | 98 lb |

EXAMPLE 10

Resin 1 (86.0 g) was thoroughly mixed with 23.8 g of IBTMS and 38.0 g of polymer F. Approximately 0.5 g of TBT was then dispersed in this mixture and the contents were heated and maintained at about 60° C. for approximately one hour. The mixture was then devolatilized as described in Example 1 and 3.1 g of a 14% TBT solution in MTM was dispersed in the molten product. The resin/polymer ratio of this composition was 62/38 and the molar ratio of silane to resin silanol was 1.0. The material was recovered in a metal cartridge and tested as described in Example 1 with the following results:

| Test Time | Force |
| --- | --- |
| 10 sec | 30 lb |
| 1 hr | 60 lb |
| 24 hr | 134 lb |

All of the pressure sensitive adhesives described in the preceding examples are within the scope of the present invention and were non-flowable solids at 25° C. and could be readily extruded from a "hot-melt" gun. All of the compositions cured to non-tacky elastomers upon exposure to ambient moist air.

COMPARATIVE EXAMPLE 1

Resin 2 (67.4 g) was thoroughly mixed with 28 g of polymer D and this mixture was devolatilized as at reduced pressure (<10 mm Hg) up to a temperature of 150° C. After restoring the reaction mixture to atmospheric pressure with nitrogen gas, 0.2 g of TBT was dispersed in the molten product to provide a PSA having a resin/polymer ratio of 60/40. The material was then recovered, placed in a metal cartridge and tested as described in Example 1 with the following results:

| Test Time | Force |
| --- | --- |
| 20 min | 25 lb |
| 1 hr | 29 lb |
| 5 hr | 64 lb |
| 24 hr | 84 lb |
| 7 days | 97 lb |

Although the adhesion of this system was acceptable, capping the resin represents an extra step in the formulation of the PSA. Moreover, unlike the present compositions, the cured composition retained some of its initial "tackiness" even after curing under ambient conditions.

COMPARATIVE EXAMPLE 2

A series of compositions were prepared according to the disclosure of Japanese Patent Application 4 (1992)-81487, cited in the Background Information section of this specification, wherein the low silanol resin was replaced with Resin 1 of the instant invention. The polymer used in this series was polymer A and the molar ratio of SiOH of the resin to hydrolyzable group on silicon ranged from 1 to 10, as suggested by the Japanese Application and shown in Table 5. Dibutyltin dimethoxide was added to each formulation at a 0.1% level based on solids content. Upon addition of the tin catalyst, white gel particulates immediately began to precipitate from solution and these could not be re-dispersed.

This example shows that it is not possible to directly substitute an uncapped resin of the instant invention for the capped resin taught by the Japanese Application. Moreover, when this experiment was repeated using capped resin (Resin 2) at a resin to polymer ratio of 60/40, the resulting stripped product remained a PSA when cured, in contrast to the compositions of the present invention which cure to non-tacky elastomers.

TABLE 5

| SAMPLE | RESIN 1 | FLUID A | SiOH/OMe |
|---|---|---|---|
| Sample 1 | 11.9 g | 23.1 g | 5.0 mol/mol |
| Sample 2 | 15.2 | 19.8 | 7.5 |
| Sample 3 | 16.8 | 18.2 | 9.0 |
| Sample 4 | 17.7 | 17.3 | 10.0 |

COMPARATIVE EXAMPLE 3

This example differentiates the present PSA compositions from those disclosed in copending application Serial No. 07/748,478, cited in the Background Information section of this specification.

A pre-mix of 0.13 g of TBT in 33.42 g of MTM was dispersed in a mixture of 180.1 g of a 26.2% solution of a hydroxyl-terminated polydimethylsiloxane gum exhibiting a plasticity of 0.95 mm, determined as described in ASTM test procedure D - 926 in xylene and 72.48 g of Resin 3. The mixture was heated and maintained at 60° C. for 3 hours and then stripped at reduced pressure (<10 mm Hg) and 90° C. to provide a PSA having a resin/polymer ratio of 55/45 wherein the molar ratio of silane to silanol in the resin was 2.2. The devolatilized material was then transferred to a metal cartridge and tested as described in Example 1 with the following results:

| Test Time | Force |
|---|---|
| 1 hr | 5 lb |
| 4 hr | 5 lb |
| 24 hr | 20 lb |
| 48 hr | 10 lb |
| 5 days | 16 lb |

This example demonstrates that compositions which employ a high molecular weight gum as the polymer portion of the PSA do not provide the high adhesion values, particularly at short contact time, which were obtained for compositions of the present invention.

Test samples prepared using the procedure described in Example 1 and the compositions described in Examples 6, 7, 9, and comparison example 1 summarized in Table 6 were placed in a 150° C. oven after each had cured to its ultimate strength, which required from two to four weeks, as determined by independent tests. Each of these samples was removed after 30 minutes and immediately tested for push out force (force required to separate the lid from the remainder of the sample) according to the method described in Example 1.

The results are presented in Table 6.

TABLE 6

| Adhesive | Adhesive Strength (150° C.) |
|---|---|
| Example 6 | 90 lb |
| Example 7 | 56 lb |
| Example 7 | 0 (not measurable) |
| Comparative Example 1 | 9 lb |

The data in Table 6 demonstrate that when the $M_n$ of the resin component of the resin ingredient is greater than about 3,000 the adhesive strength at elevated temperatures, herein referred to as thermal hold, is greatly increased relative to formulations wherein the resin has an $M_n$ below this value (Example 9). Further, the thermal hold value is also significantly diminished when the resin is capped with a non-reactive moiety, as in the case of Comparative Example 1.

EXAMPLE 11

To illustrate the stabilizing effect of the silane component of the present invention, the following experiment was carried out.

Polymer G (22.5 g) was thoroughly mixed with 38.1 g of Resin 1. To 5 g aliquots of this solution sufficient TEOS was added to produce silane/SiOH molar ratios shown in Table. One drop of TBT was added to each solution followed by mixing overnight at room temperature. The resultant solutions were stored at room temperature and monitored for changes in viscosity and ultimate gelation, the results being presented in Table 7.

TABLE 7

| SAMPLE | TEOS/SiOH MOLAR RATIO | DAYS TO GEL |
|---|---|---|
| A | 0.0 | <6 |
| B | 0.01 | 17–24 |
| C | 0.02 | 24–48 |
| D | 0.05 | 24–48 |
| E | 0.1 | >48 |

This experiment was repeated to illustrate effectiveness of a different silane (MTO) in providing stability to the instant systems, the results being shown in Table 4.

TABLE 4

| SAMPLE | MTO/SiOH MOLAR RATIO | DAYS TO GEL |
|---|---|---|
| F | 0.0 | <6 |
| G | 0.01 | 3–10 |
| H | 0.02 | 3–10 |
| I | 0.05 | 3–10 |
| J | 0.1 | 10–34 |
| K | 0.2 | 10–34 |
| L | 0.3 | >34 (clear, one-phase, fluid) |
| M | 0.4 | >34 (clear, one-phase, fluid) |

Another similar series of compositions were prepared to illustrate the influence of fluid molecular weight on stability of the resin/fluid blends.

Polymer H (22.5 g) was thoroughly mixed with 38.1 g of Resin 1 and 5 g aliquots of this solution were mixed with the amounts of TEOS shown in Table 5. Again, one drop of TBT was added to each solution and these were monitored, the results being given in Table 8.

TABLE 8

| SAMPLE | TEOS/SiOH MOLAR RATIO | DAYS TO GEL |
|---|---|---|
| N | 0.0 | <6 |
| O | 0.01 | 17–24 |
| P | 0.02 | 24–48 |
| Q | 0.05 | 24–48 |
| R | 0.1 | >48 (clear, one-phase, fluid) |

The data in Table 8 demonstrate that, even though the PSA compositions based on hydroxyl-functional resin and alkoxy-functional fluid do cure, the stability of these compositions is inadequate unless some additional silane of the invention is incorporated therein.

That which is claimed is:

1. A method for bonding one substrate to another using a curable organosiloxane composition, the method comprising the sequential steps of
    I) causing a curable organosiloxane composition to become flowable by heating the composition above its flow-transition temperature, where the curable composition comprises (a) a resinous organosiloxane copolymer comprising monovalent $R^1{}_3SiO_{\frac{1}{2}}$ units, tetravalent $SiO_{4/2}$ units and up to 6 weight percent, based on the weight of said copolymer, of $XSiO_{3/2}$ units, where X is at least one member selected from the group consisting of hydroxyl groups, hydrolyzable groups and trihydrocarbylsiloxy groups, $R^1$ is a monovalent hydrocarbon radical, the molar ratio of $R^1{}_3SiO_{\frac{1}{2}}$ to $SiO_{4/2}$ units is from 0.5 to 1.2, and the glass transition temperature of said copolymer is above ambient temperature, and (b) a polyorganosiloxane having a viscosity of from 0.02 to 100 Pa. s at 25° and containing an average of more than two hydrolyzable groups per molecule, at least 80 percent of the repeating units of said polyorganosiloxane are disiloxane units, and where the amount of said resinous organosiloxane copolymer relative to said polyorganosiloxane is sufficient for a vertical layer of said composition to be substantially non-flowable at 25° C. prior to reaction of said hydrolyzable groups and for said composition to have a flow transition temperature within the range from 40° to 200° C.;
    II) applying said composition while in the molten state to at least one surface of a substrate to form a bonding layer;
    III) contacting said bonding layer with a second substrate prior to any substantial increase in the flow transition temperature of said composition to achieve adhesive bonding of said first and second substrates, and
    IV) exposing the bonded substrates to moisture for a time sufficient to react said hydrolyzable groups to form a crosslinked structure and increase the flow transition temperature of said composition by at least 10° C.

2. A method according to claim 1 where $R^1$ contains up to 20 carbon atoms, the molar ratio of monovalent to tetravalent units in said copolymer is from 0.5 to 1.5, up to 20 percent of the repeating units in said polyorganosiloxane are trifunctional units, with the remainder being diorganosiloxane units of the formula $R^2R^3SiO$, where $R^2$ is an alkoxy group or a monovalent unsubstituted or substituted hydrocarbon radical, $R^3$ is a monovalent unsubstituted or substituted hydrocarbon radical, the terminal units present on said polyorganosiloxane are represented by the formula $R^5{}_aY_{3-a}SiG$, where $R^5$ is aminoalkyl or $R^1$, Y is a hydrolyzable group, G represents a divalent group linking the silicon atom of the terminal unit with another silicon atom and a is 0 or 1, and said resinous organosiloxane copolymer constitutes from 40 to 80 percent of the combined weight of said copolymer and said polyorganosiloxane.

3. A method according to claim 2 where $R^1$ contains from 1 to 10 carbon atoms, the molar ratio of monovalent to tetravalent units in said copolymer is from 0.6 to 0.9; X is selected from the group consisting of hydroxyl, alkoxy, ketoximo and trialkylsiloxy groups; the number average molecular weight of said copolymer is from 1000 to 10,000; at least 50 percent of the hydrocarbon radicals represented by $R^2$, $R^3$ and $R^4$ are lower alkyl; the viscosity of said polyorganosiloxane at 25° C. is from 0.5 to 25 Pa.s; Y is selected from the group consisting of alkoxy, ketoximo, alkenyloxy, carboxy, amidoxy and aminoxy when a is 0 and Y is alkoxy when a is 1, $R^5$ is alkyl or aminoalkyl; G is oxygen; and the melt viscosity of said composition at the temperature at which said composition is applied to said substrate is less than 10 Pa.s.

4. A method according to claim 3 wherein $R^1$ is selected from the group consisting of alkyl, substituted alkyl, alkenyl, cycloalkyl and aryl radicals; the X groups on said copolymer are hydroxyl; the number average molecular weight of said copolymer is from 2700 to 6500; the terminal groups present on said polyorganosiloxane are selected from the group consisting of trimethoxysiloxy, methyldimethoxysiloxy, and N-(2-aminoethyl)-3-aminopropyldimethoxysiloxy; and said composition contains a curing agent containing an average of more than two silicon-bonded hydrolyzable groups per molecule.

5. A method according to claim 4 where said curing agent is a silane of the formula $R^6{}_nSiZ_{4-n}$, where Z represents a hydrolyzable group that reacts with the terminal groups present on said polyorganosiloxane, $R^6$ is selected from the same group of hydrocarbon radicals as $R^1$ and n is 0 or 1.

6. A method according to claim 5 where said composition contains a catalyst to facilitate curing of said composition, $R^6$ is alkyl and Z is alkoxy.

7. A method according to claim 1 where said composition is applied by spraying or by spreading said composition over a surface of said substrate using an applicator heated to a temperature above the flow transition temperature of said composition.

8. A method according to claim 1 where said composition is prepared by reacting a precursor of said polyorganosiloxane having silanol groups in the terminal positions with a silane of the formula $R^6{}_nSiZ_{4-n}$ where $R^6$ represents an alkyl or phenyl radical. n is 0 or 1 and Z is a hydrolyzable group that reacts with said silanol groups in the presence of a suitable catalyst and adding said copolymer to the resultant reaction mixture.

9. A method according to claim 1 where the substrates to be bonded are selected form the group consisting of organic polymers and inorganic materials.

10. A method according to claim 9 where said substrates are organic condensation type or addition type polymers.

11. A method according to claim 9 where said substrates are glass and metal.

12. A method according to claim 11 where said substrates are the glass and spacer portions of an insulating glass unit and said composition is applied to said spacer portion.

13. A method according to claim 1 where the flow transition temperature of said composition is increased by at east 50 degrees following reaction of said hydrolyzable groups.

14. A method according to claim 13 where the flow transition temperature of said composition following reaction of said hydrolyzable groups is at least 200° C.

* * * * *